United States Patent Office 3,345,337
Patented Oct. 3, 1967

3,345,337
PROCESS FOR THE MANUFACTURE OF FILM-
AND FIBER-FORMING POLYESTERS
Walter Koller, Herbert Becker, and Hans Hoyer, Frankfurt am Main, Germany, assignors to Farbwerke Hoechst Aktiengesellschaft vormals Meister Lucius & Bruning, Frankfurt am Main, Germany, a corporation of Germany
No Drawing. Filed July 22, 1963, Ser. No. 296,465
Claims priority, application Germany, July 25, 1962, F 37,416
9 Claims. (Cl. 260—75)

The present invention relates to an improved process for the manufacture of film- and fiber-forming polyesters or copolyesters consisting wholly or partially of aromatic dicarboxylic acids and diols.

Polyesters are advantageously made in industry by subjecting lower alkyl esters of dicarboxylic acids to an ester-interchange with diols and polycondensing the "precondensate" so obtained by heating in vacuo. Both reaction stages, the ester-interchange and the polycondensation, are considerably accelerated by the addition of a catalyst.

Short reaction times are not only important for reasons of economy but they are also necessary in order to prevent chain-terminating and chain-splitting reactions, which will otherwise take place at the high polycondensation temperatures and which could lead to polyesters having a low degree of polycondensation and a low degree of whiteness.

A large number of catalysts have been known for the manufacture of the polyesters. These catalysts catalyze either the ester-interchange or the polycondensation or both reaction stages (cf. the survey by R. E. Wilfong, Journal of Polymer Science 54, 385 (1961)).

In general, the said catalysts and the polyesters obtained with the use of the catalysts do not meet all the demands made on them. A catalyst for the manufacture of polyesters must be effective and thermally and chemically stable, and must not catalyze side reactions, for example dehydration reactions, thermal degradation or degradation under the action of light. It is furthermore desired that the degree of whiteness of the polyesters obtained be as high as possible.

Now we have found that linear synthetic film- and fiber-forming polyesters or copolyesters consisting wholly or partially of aromatic dicarboxylic acids and diols can be obtained by using indium, indium alloys or indium compounds as catalysts for the ester-interchange and/or the polycondensation.

Indium and its compounds make highly active catalysts which enable polycondensates of excellent properties to be obtained within a shorter time and with smaller amounts of catalyst than with the use of the common catalyst systems. The products so obtained are distinguished by a high melting point, an excellent degree of whiteness and an excellent stability towards heat and light.

When the catalyst is indium metal, the indium (melting point 156.4° C.) which is liquid under the polycondensation conditions accumulates, without having been changed, at the bottom of the reaction vessel after the polycondensation has been terminated, so that it can be easily separated from the polycondensate and used again as a catalyst. It is particularly advantageous, for example, to apply the indium metal by mechanical or electrolytic means in a thin layer to the stirrer, the walls of the vessel or other parts of apparatus of stainless steel which come in contact with the material to be polycondensed, and then causing the indium metal to diffuse into the stainless steel by heating at elevated temperatures. The feeble content of indium of the metal parts thus treated, for example $10^{-4}$ to $10^{-6}$ grams of indium per cm.$^2$ of metal surface, imparts to the metal parts a surprisingly high catalytic action which lasts a long time. Polyesters having a high degree of whiteness and a high degree of polycondensation are obtained which contain only minimum amounts of less than $10^{-5}\%$ by weight of indium.

Exemplary of suitable polycondensation catalysts for the process of the invention are, besides indium metal and its alloys, the following indium compounds:

Indium (III) oxide,
Indium (III)-fluoride, indium (III) sulfate,
Indium (III) borate, indium (III) phosphate,
Potassium hexachloro-indate (III), indium (II) chloride,
Indium (III) formate, indium (III) acetate,
Indium (III) succinate, indium (III) adipate,
Indium (III) oxalate, indium (III) tartrate,
Basic indium (III) salts of
Propionic acid, butyric acid, benzoic acid,
Indium (III) acetylacetonate, indium (III) acetonylacetonate.

Exemplary of substances catalyzing the ester-interchange as well as the polycondensation are the following halides: indium (III) chloride and indium (III) bromide.

Although compounds of trivalent indium are particularly well suited, since they are colorless or only slightly colored, mono- or bivalent indium compounds may, in principle, also be used as catalysts.

In the process of the invention, indium or indium compounds are advantageously used in such an amount that $10^{-4}$ to $10^{-1}\%$ by weight, calculated on dicarboxylic acid ester, of indium is present in the reaction mixture, colorless products of a high degre of polycondensation being obtained.

The process of the present invention is not limited to the discontinuous manufacture of polyesters, but it may be applied with particular advantage also to the continuous manufacture of polyesters.

Exemplary of polyesters to be obtained by the process of the invention are polyalkylene terephthalates, such as polyethylene terephthalate, and esters or terephthalic acid with aliphatic glycols having 1 to 10 carbon atoms, or their copolymers with minor amounts of isophthalic acid, 4,4'-diphenyl-dicarboxylic acid, hexahydroterephthalic acid, adipic acid, sebacic acid, naphthalene dicarboxylic acids, 2,5-dimethyl-terephthalic acid, 5-sulfo-isophthalic acid, bis-para-carboxy-phenoxyethane, parahydroxybenzoic acid or aliphatic diols, e.g. butane diol, aromatic diols and cycloaliphatic diols, e.g. cyclobutane diol and 1,4-dimethylol cyclohexane.

The following examples serve to illustrate the invention, but they are not intended to limit it thereto. The parts are by weight and the percentages are percent by weight calculated on the dicarboxylic acid ester. The relative viscosity $\eta$ rel. was determined on a 1% solution of the polyester in phenol/tetrachlorethane (3:2) at 25° C.

Example 1

124.8 grams of terephthalic acid dimethyl ester, 119.5 grams ethylene glycol and 0.0246 gram zinc acetate were heated for 6 hours at 190 to 210° C., while stirring, whereby an ester-interchange product consisting substantially of terephthalic acid-bis-β-hydroxyethyl ester was formed with splitting off of methanol. The "precondensate" so obtained was polycondensed with splitting off of ethylene glycol, using a flat paddle mixer of stainless steel [17.5% of chromium, 11.5% of nickel, 2.2% of molybdenum, 0.07 to 0.10% of carbon (stabilized with $TiO_2$ or niobium)] which had a surface area of 20 cm.$^2$ and had been activated by applying to it 0.0012 gram metallic indium of 99.9% strength and causing the latter to diffuse into the material of the flat paddle mixer by heating for 3 hours, at 500° C. To perform the polycondensation, the ester-interchange product was first heated to 250° C. under nitrogen, while stirring, the pressure being slowly increased to 1 millimeter of mercury within 3½ hours, the temperature was then raised to 278° C. within 30 minutes and kept at that value for a further 90 minutes to complete the polycondensation. A colorless polycondensate, having a relative viscosity of 1.809 and a melting point of 256° C., was obtained. The indium content of the polyester amounted to about $1.10^{-4}\%$.

The stirrer could be used for further polycondensations. For example, after a second polycondensation the indium content of the polyester was below $3.10^{-5}\%$. Even an 8th polycondensation carried out under the same conditions with the use of this stirrer yielded a colorless product of the same high degree of polycondensation. A comparison test carried out under the same conditions with the use of a flat paddle mixer of the same material, but which had not been treated with indium, yielded a polycondensate having a relative viscosity of only 1.647 and a melting point of 252° C.

Example 2

The ester-interchange product was prepared as described in Example 1. After the addition of 1 gram indium metal, the polycondensation was carried out as described in Example 1, using a glass stirrer. After polycondensing for 80 minutes, a colorless polycondensate of a relative viscosity of 1.76 was obtained. When the reaction was terminated, the indium accumulated in the form of a drop at the bottom of the reaction vessel, without having been changed.

Example 3

An ester-interchange product was prepared as described in Example 1 from 124.8 parts terephthalic acid dimethyl ester, 119.5 parts ethylene glycol and 0.0246 part zinc acetate. After the addition of 0.0025 part indium acetyl acetonate, the ester-interchange product was polycondensed in the manner described in Example 1 in a glass apparatus with the use of a glass stirrer. After polycondensing for 3½ hours at 278° C. under a pressure of 1 millimeter of mercury, a colorless polycondensate, having a relative viscosity of 1.86 and a melting point of 256° C., was obtained. When the amount of indium acetyl acetonate was reduced to 0.00025 part a polyester of a relative viscosity of 1.76 was obtained after 150 minutes at 278° C. under a pressure of 1 millimeter of mercury.

Example 4

0.0025 part indium (III) acetate was added to an ester-interchange product prepared as described in Example 1 from 124.8 parts terephthalic acid dimethyl ester, 119.5 parts ethylene glycol and 0.0246 part zinc acetate. The ester-interchange product was then polycondensed in the manner described in Example 1 in a glass apparatus with the use of a glass stirrer. After polycondensing for 130 minutes at 278° C. under a pressure of 1 millimeter of mercury, a colorless polycondensate, having a relative viscosity of 1.83 and a melting point of 256° C., was obtained.

Example 5

An ester-interchange product was prepared as described in Example 1 from 124.8 parts terephthalic acid dimethyl ester, 119.6 parts ethylene glycol and 0.0249 part zinc acetate. After the addition of 0.0246 part indium (III) oxide the ester-interchange product was polycondensed. After polycondensing for 2½ hours at 278° C. under a pressure of 1 millimeter of mercury, a colorless polycondensate of a relative viscosity of 1.76 was obtained.

Example 6

An ester-interchange product, prepared by heating 97 parts terephthalic acid dimethyl ester, 93 parts ethylene glycol and 0.0194 part indium (III) chloride for 6½ hours at 190 to 210° C., was polycondensed, without any further addition, in a glass apparatus in the manner described in Example 1. After heating for 90 minutes at 278° C. under a pressure of 1 millimeter of mercury, a colorless polycondensate of a relative viscosity of 1.83 was obtained.

Example 7

An ester-interchange product was prepared in the manner described in Example 1 from 87.4 parts terephthalic acid dimethyl ester, 9.7 parts isophthalic acid dimethyl ester, 91 parts ethylene glycol and 0.0194 part zinc acetate by heating for 3¾ hours at 190 to 210° C. After the addition of 0.0194 part indium acetate, the ester-interchange product was polycondensed as described in Example 1. After heating for 2¾ hours at 278° C. under a pressure of 1 millimeter of mercury, a colorless polycondensate, having a relative viscosity of 1.83 and a melting point of 234° C., was obtained.

Example 8

A ester-interchange product was prepared in the manner described in Example 1 from 138 parts terephthalic acid dimethyl ester, 4.6 parts 5-sulfo-isophthalic acid dimethyl ester, 101 parts ethylene glycol and 0.0348 part zinc acetate. After the addition of 0.0276 part indium acetate the ester-interchange product was polycondensed in the manner described in Example 1 in a glass apparatus. After heating for 2½ hours at 278° C. under a pressure of 1 millimeter of mercury, a colorless polycondensate, having a relative viscosity of 1.70 and a melting point of 196° C., was obtained.

Example 9

An ester-interchange product was prepared in the manner described in Example 1 from 124.8 parts terephthalic acid dimethyl ester, 119.6 parts ethylene glycol and 0.0249 part zinc acetate. After the addition of 0.0025 part indium (III) formate, the ester-interchange product was polycondensed. After poly-condensing for 2 hours at 278° C. under a pressure of 0.5 millimeter of mercury, a colorless polycondensate, having an excellent degree of whiteness and a relative viscosity of 1.93, was obtained.

We claim:

1. A process for producing polymeric polyesters by an ester interchange and polycondensation of a lower alkyl ester of an aromatic dicarboxylic acid and a diol selected from the group consisting of an aliphatic diol and a cycloaliphatic diol, said process being carried out in the presence of an indium catalyst selected from the group consisting of indium metal, indium salts of inorgainc acids, indium salts of organic acids, indium (III) acetylacetonate, indium (III) acetonyl acetonate, and an indium alloy prepared by applying a thin layer of indium metal to a surface of a stainless steel and then causing the indium alloy to diffuse into said stainless steel at elevated temperatures.

2. A process for producing linear polymeric film- and fiber-forming copolyesters by an ester interchange and a subsequent polycondensation of a mixture of lower alkyl esters of terephthalic acid and lower alkyl esters of a carboxylic acid selected from the group consisting of isophthalic acid, 4,4′-diphenyl dicarboxylic acid, hexahydroterephthalic acid, adipic acid, sebacic acid, a naphthalene dicarboxylic acids, 2,5-dimethylterephthalic acid, 5-sulfo-isophthalic acid, bis-para-carboxyphenyl-ethane, and para-hydroxybenzoic acid, said acid being reacted with a diol selected from the group consisting of ethylene glycol, butane diol, an aromatic diol, cyclobutane diol and 1,4-dimethylol cyclohexane, said process being carried out at least during the polycondensation in the presence of an indium catalyst selected from at least one member of the group consisting of indium metal, an indium salt of an inorganic acid, indium (III) acetylacetonate, and indium (III) acetonyl acetonate.

3. A process for producing linear polymeric film- and fiber-forming polyesters by an ester interchange and subsequent polycondensation of the ester-interchange product of a lower alkyl ester of terephthalic acid and aliphatic diol of 2 to 10 carbon atoms, said process being carried out in the presence of an indium compound as the catalyst for the ester interchange and polycondensation, said indium compound being selected from at least one member of the group consisting of indium (III) and indium (III) bromide.

4. A process for the manufacture of linear polymeric film- and fiber-forming copolyesters by subjecting lower alkyl esters of terephthalic acid and alkyl esters of a carboxylic acid selected from the group consisting of isophthalic acid, 4,4'-diphenyl dicarboxylic acid, hexahydroterephthalic acid, adipic acid, sebacic acid, naphthalene dicarboxylic acids, 2,5-dimethyl-terephthalic acid, 5-sulfoisophthalic acid, bis-para-carboxy-p-henoxyethane and para-hydroxybenzoic acid to an ester-interchange with ethylene glycol and by subjecting the product of the ester-interchange to a subsequent polycondensation, said process being carried out in the presence of an indium compound selected from the group consisting of indium (III) chloride and indium (III) bromide as the catalyst for the ester-interchange and the polycondensation.

5. A process for the manufacture of linear polymeric film- and fiber-forming copolyesters by subjecting lower alkyl esters of terephthalic acid to an ester-interchange with ethylene glycol and a diol selected from the group consisting of butane diol, cyclobutane diol and 1,4-dimethylol cyclohexane and by subjecting the product of the ester-interchange to subsequent polycondensation, said process being carried out in the presence of an indium compound selected from the group consisting of indium (III) chloride and indium (III) bromide as the catalyst for the ester-interchange and the polycondensation.

6. A process for the manufacture of linear polymeric film- and fiber-forming polyesters of terephthalic acid by subjecting a lower alkyl ester of terephthalic acid to an ester-interchange with an aliphatic diol having 2 to 10 carbon atoms and by subjecting the product of the ester-interchange to a subsequent polycondensation, said process being carried out in the presence of an indium compound selected from the group consisting of indium metal, indium (III) oxide, indium (III) fluoride, indium (III) chloride, indium (III) bromide, indium (III) sulfate, indium (III) borate, indium (III) phosphate, potassium hexachloroindate (III), indium (II) chloride, indium (III) formate, indium (III) acetate, indium (III) succinate, indium (III) adipate, indium (III) oxalate, indium (III) tartrate, basic indium (III) salts of propionic acid, basic indium (III) salts of butyric acid and basic indium (III) salts of benzoic acid, indium (III) acetylacetonate, indium (III) acetonyl acetonate, and an indium alloy prepared by applying a thin layer of indium metal to a surface of stainless steel and then causing the indium metal to diffuse into said stainless steel at elevated temperatures as a catalyst for the polycondensation.

7. A process for the manufacture of linear polymeric film- fiber-forming copolyesters by subjecting lower alkyl esters of terephthalic acid and lower alkyl esters of a carboxylic acid selected from the group consisting of isophthalic acid, 4,4'-diphenyl dicarboxylic acid, hexahydroterephthalic acid, adipic acid, sebacic acid, naphthalene dicarboxylic acids, 2,5-dimethyl-terephthalic acid, 5-sulfoisophthalic acid, bis-para-carboxy-phenoxyethane and para-hydroxybenzoic acid to an ester-interchange with an aliphatic diol having 2 to 10 carbon atoms and by subjecting the product of the ester-interchange to a subsequent polycondensation said process being carried out in the presence of an indium compound selected from the group consisting of indium metal, indium (III) chloride, indium (III) bromide, indium (III) sulfate, indium (III) borate, indium (III) phosphate, potassium hexachloroindate (III), indium (II) chloride, indium (III) formate, indium (III) acetate, indium (III) succinate, indium (III) adipate, indium (III) oxalate, indium (III) tartrate, basic indium (III) salts of propionic acid, basic indium (III) salts of butyric acid, basic indium (III) salts of benzoic acid, indium (III) acetylacetonate, indium (III) acetonyl acetonate, and indium alloy prepared by applying a thin layer of indium metal to a surface of a stainless steel and then causing the indium metal to diffuse into said stainless steel at elevated temperatures as a catalyst for the polycondensation.

8. A process for the manufacture of linear polymeric film- and fiber-forming copolyesters by subjecting alkyl esters of terephthalic acid to an ester-interchange with ethylene glycol and a diol selected from the group consisting of butane diol, cyclobutane diol and 1,4-dimethylol cyclohexane and by subjecting the product of the ester inter-change to a subsequent polycondensation, said process being carried out in the presence of an indium compound selected from the group consisting of indium metal, indium (III) oxide, indium (III) fluoride, indium (III) chloride, indium (III) bromide, indium (III) sulfate, indium (III) borate, indium (III) phosphate, potassium hexachloro-indate (III), indium (II) chloride, indium (III) acetate, indium (III) formate, indium (III) acetate, indium (III) succinate, indium (III) adipate, indium (III) oxalate, indium (III) tartrate, basic indium (III) salts of propionic acid, basic indium (III) salts of butyric acid, basic indium salts (III) of benzoic acid, indium (III) acetylacetonate, indium (III) acetonyl acetonate and an indium alloy prepared by applying a thin layer of indium metal to a surface of a stainless steel and then causing the indium metal to diffuse into said stainless steel at elevated temperatures as a catalyst for the polycondensation.

9. The process according to claim 1 wherein the indium is present in an amount of $10^{-4}$ to $10^{-1}\%$ calculated on weight basis of the lower alkyl ester of the aromatic dicarboxylic acid.

References Cited

UNITED STATES PATENTS

| | | | |
|---|---|---|---|
| 1,935,177 | 11/1933 | Connolly et al. | 252—463 |
| 2,748,147 | 3/1957 | Strecker et al. | 252—463 |
| 3,254,055 | 5/1966 | Smith | 260—75 |

WILLIAM H. SHORT, *Primary Examiner.*

L. P. QUAST, *Assistant Examiner.*